(12) United States Patent
Sivan et al.

(10) Patent No.: US 9,487,350 B2
(45) Date of Patent: Nov. 8, 2016

(54) METHOD AND APPARATUS FOR MAINTAINING PRODUCE IN A TRANSPORTATION CONTAINER

(71) Applicant: Pimi Agro Cleantech Ltd., Kibutz Alonim (IL)

(72) Inventors: Amnon Sivan, Ma'as (IL); Nimrod Ben-Yehuda, Timrat (IL)

(73) Assignee: Pimi Agro CleanTech Ltd., Kibutz Alonim (IL)

( * ) Notice: Subject to any disclaimer, the term of this patent is extended or adjusted under 35 U.S.C. 154(b) by 24 days.

(21) Appl. No.: 13/924,573

(22) Filed: Jun. 23, 2013

(65) Prior Publication Data

US 2014/0374501 A1 Dec. 25, 2014

(51) Int. Cl.
*A23L 3/34* (2006.01)
*B01F 3/04* (2006.01)
*B65D 88/74* (2006.01)
*A23B 7/158* (2006.01)

(52) U.S. Cl.
CPC ............ *B65D 88/745* (2013.01); *A23B 7/158* (2013.01); *A23L 3/34* (2013.01); *B01F 3/0407* (2013.01); *B65D 2588/746* (2013.01)

(58) Field of Classification Search
CPC .. B01F 3/04; B01F 3/04007; B01F 3/04021; B01F 3/0407; A23L 3/34; A23L 3/3409
USPC .................................. 261/78.2, 81; 426/532
See application file for complete search history.

(56) References Cited

U.S. PATENT DOCUMENTS

| 4,173,651 A | 11/1979 | Muramoto et al. |
| 2010/0224697 A1 | 9/2010 | Modlin et al. |
| 2013/0183749 A1* | 7/2013 | Aamodt et al. ............ 435/287.1 |

FOREIGN PATENT DOCUMENTS

| JP | 2004147643 | 5/2004 |
| WO | WO2005023679 | 3/2005 |
| WO | WO2012037294 | 3/2012 |

OTHER PUBLICATIONS

International Search Report for application PCT/IB2014/062532 dated Oct. 29, 2014.

* cited by examiner

*Primary Examiner* — Robert A Hopkins
(74) *Attorney, Agent, or Firm* — Eitan, Mehulal & Sadot

(57) ABSTRACT

An apparatus for maintaining produce stored in a transportation container is disclosed. The apparatus includes a housing of the shape and size of at least one crate storing the produce, the housing having at least one opening therein; and at least one ultrasonic nebulizer for generating fog from a liquid pesticide, the fog rising through the opening to generate a cloud of micro droplets of the pesticide in the container.

18 Claims, 5 Drawing Sheets

METHOD AND APPARATUS FOR MAINTAINING PRODUCE IN A TRANSPORTATION CONTAINER

FIELD OF THE INVENTION

The present invention relates to maintaining the quality and preventing quantity losses of produce generally and to doing so in a transportation container in particular.

BACKGROUND OF THE INVENTION

Produce, such as meat, dairy, eggs, fish, fruits and vegetables, are perishable. The produce may decay completely (thus becoming a total loss) or the quality of the produce may go down, typically due to bacterial infestation. After the, produce is processed or packed it may be shipped and/or stored in cold storage and/or in ambient storage, and if necessary, pesticides, such as fungicides, bactericides and virucides of various kinds can be used in the storage room to reduce the chances of decay of the produce.

The pesticides may be applied to the produce in many ways. For example, they may be applied by aerosol spraying, with water sprinklers, by gas, or by fogging.

PCT Patent Publication WO 2005023679 to McLiskey describes an aerosol sprayer for pesticides for a shipping container or a reefer. The pesticides are light sensitive, and the device includes a light sensor which mechanically activates the aerosol sprayer in the dark.

SUMMARY OF THE PRESENT INVENTION

There is provided in accordance with a preferred embodiment of the present invention, an apparatus for maintaining produce stored in a transportation container. The apparatus includes a housing of the shape and size of at least one crate storing the produce, the housing having at least one opening therein. The apparatus also includes at least one ultrasonic nebulizer for generating fog from a liquid pesticide, the fog rising through the opening to generate a cloud of micro droplets of the pesticide liquid in the container.

Further, in accordance with a preferred embodiment of the present invention, the ultrasonic nebulizer also includes a tank of the liquid pesticide; a reservoir holding an active amount of the liquid pesticide; a float switch to maintain the reservoir with a predetermined amount of liquid; and a breaker to reduce the amount of waves in the reservoir.

Still further, in accordance with a preferred embodiment of the present invention, the apparatus includes a battery power source or any other power source.

Moreover, in accordance with a preferred embodiment of the present invention, the liquid pesticide is a formulation of stabilized hydrogen peroxide.

Additionally, in accordance with a preferred embodiment of the present invention, the liquid pesticide is at least one of TBZ and Imazalil.

Further, in accordance with a preferred embodiment of the present invention, the fog includes droplets of less than 10 µm in size.

Still further, in accordance with a preferred embodiment of the present invention, the apparatus includes a controller to operate the at least one ultrasonic nebulizer.

Additionally, in accordance with a preferred embodiment of the present invention, the controller includes a timer to control the interval and length of the operation of the at least one ultrasonic nebulizer.

Moreover, in accordance with a preferred embodiment of the present invention, the transportation container is any of the following containers: a marine container, a truck container, and a train wagon.

Further, in accordance with a preferred embodiment of the present invention, the transportation container is any of the following containers: a refrigerated container, a ventilated container and a dry van container.

Still further, in accordance with a preferred embodiment of the present invention, the at least one ultrasonic nebulizer is formed on a floatation device.

Additionally, in accordance with a preferred embodiment of the present invention, the apparatus includes a blower to move the cloud away from the opening and a blower pipe to direct the cloud within the container.

There is provided in accordance with a preferred embodiment of the present invention, a method for maintaining produce stored in a transportation container. The method includes generating a fog of antiseptic air from a liquid pesticide throughout the transportation container, the fog having micro droplets of pesticide, wherein the droplets are of less than 10 microns in size.

Moreover, in accordance with a preferred embodiment of the present invention, the liquid pesticide is a formulation of stabilized hydrogen peroxide.

Moreover, in accordance with a preferred embodiment of the present invention, the liquid pesticide is at least one of TBZ and Imazalil.

Still further, in accordance with a preferred embodiment of the present invention, the generating includes activating an ultrasonic nebulizer to generate the fog at predetermined intervals of predetermined length.

Additionally, in accordance with a preferred embodiment of the present invention, the transportation container is one of the following containers: a marine container, a truck container a train wagon, a reefer container, a ventilated container and a dry van container.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
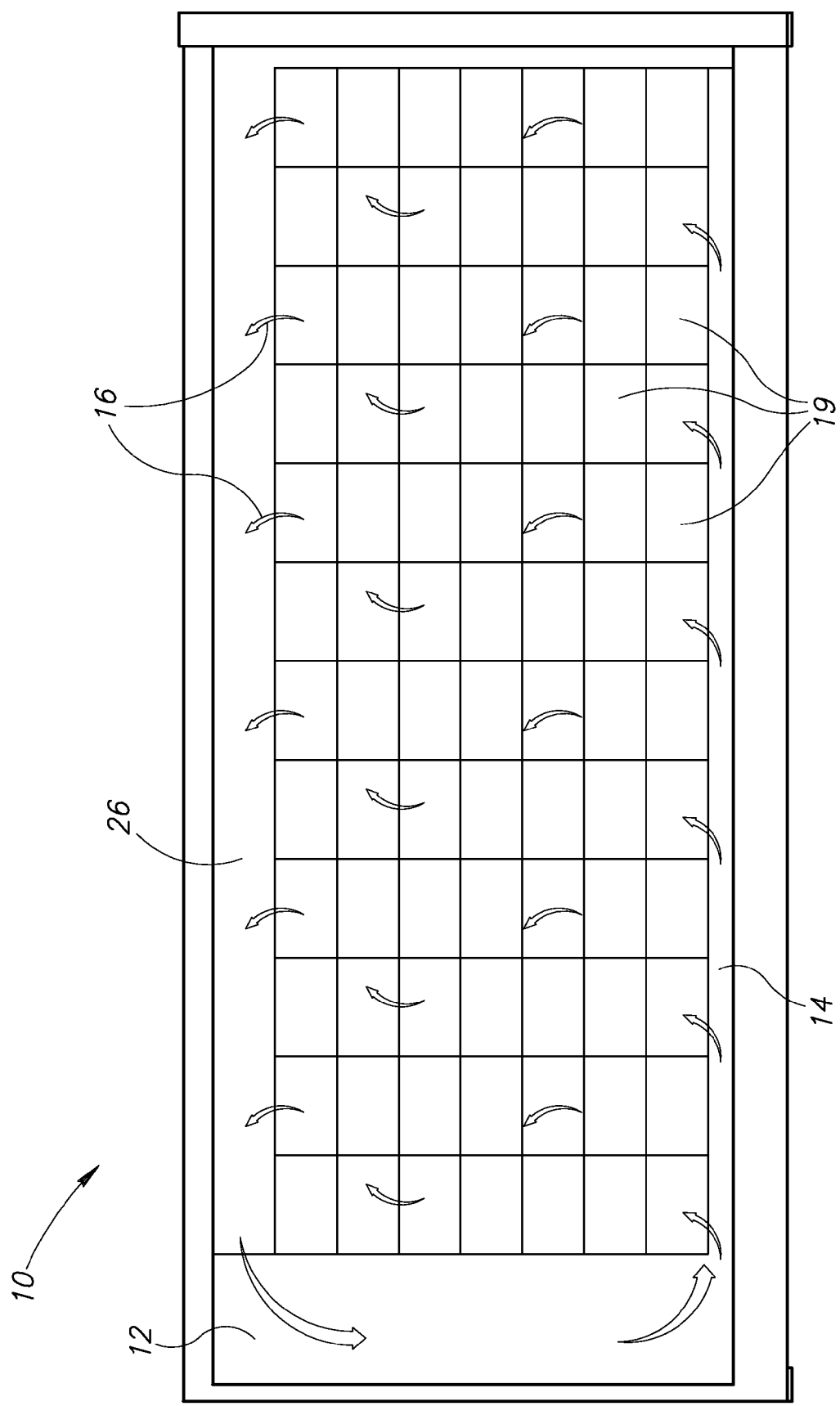
FIG. 1 is a schematic illustration of a prior art reefer for produce.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that produce is vulnerable during transportation, whether over water or over land, even if the produce is properly stored in an appropriate storage room. Moreover, Applicants have realized that ultrasonic fogging provides a significantly small droplet size, of less than 10 μm and often on the order of 1-5 μm, and that such small droplets may hang in the air for a significantly long time. By hanging in the air, the small droplets may move freely in the container due to the air circulation existing in the container and may, as a result, penetrate throughout the container, including into the tiniest gaps or empty spaces around the produce. For example, in citrus fruits, which usually are packed in an open tray, the small droplets may reach the fruit directly. Thus pesticide may be applied to all if not most of the produce held in the transportation container or reefer. Moreover, this may result in antiseptic air throughout the container.

Reference is now made to FIG. 1, which illustrates an exemplary transportation container, such as a marine reefer 10. Reefer 10 may provide cool air to the produce and as such may comprise a refrigeration unit 12, which may circulate cool air, and a T-floor 14 below the cargo to enable airflow, shown with arrows 16, throughout reefer 10. Reefer 10 may require an air space 26 above the crates, shown as rectangles 19, to enable sufficient air flow. It will be appreciated that there may be different types of reefers such as for a truck reefer, the flow of air may be reversed and be from the top to the bottom of the reefer.

Figure 2:
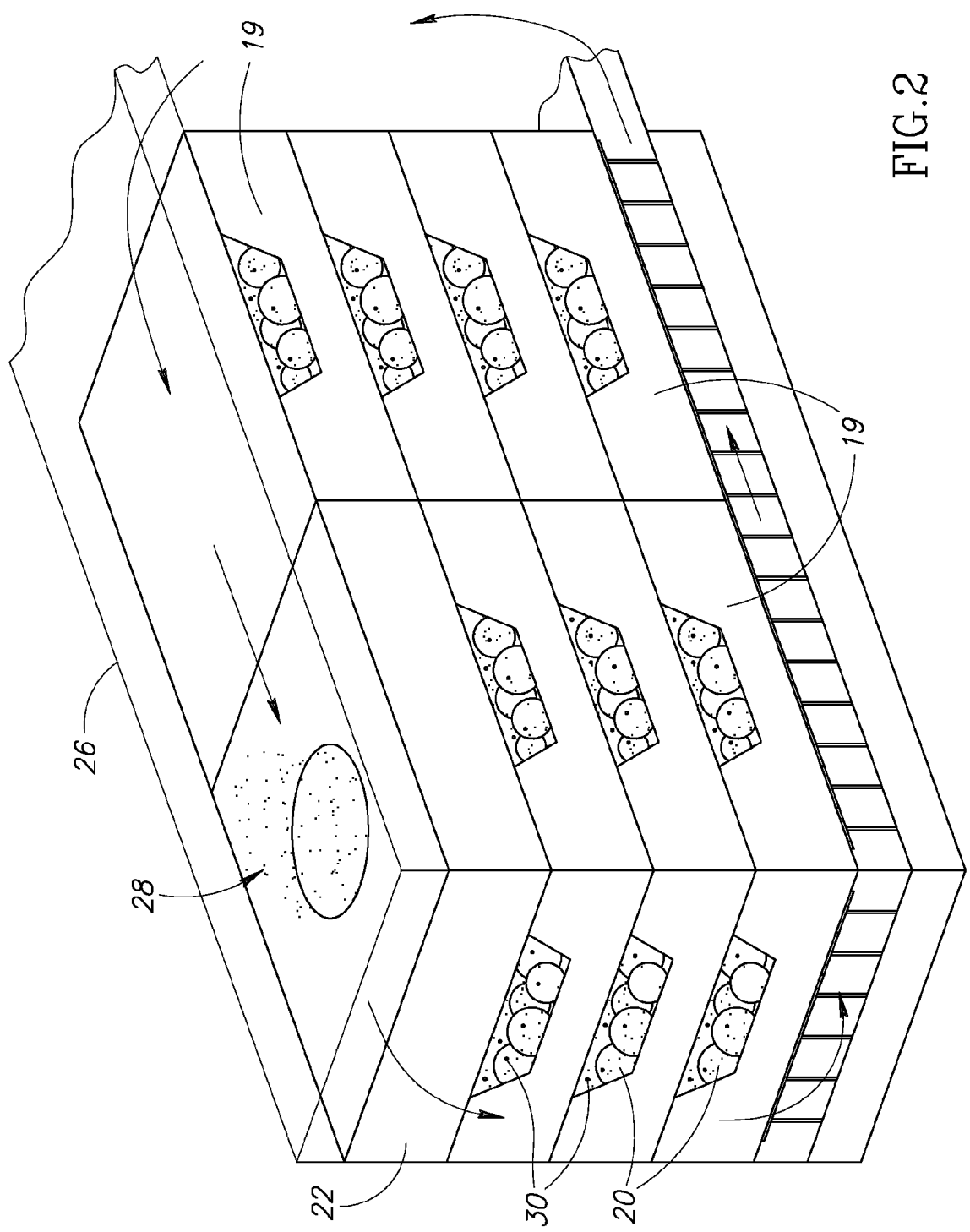
FIG. 2 is a schematic illustration of a container having an ultrasonic fogger, constructed and operative in accordance with a preferred embodiment of the present invention.

Reference is now made to FIG. 2, which details a subsection of reefer 10 with some exemplary crates 19 in which some produce 20 may be placed. A fogger 22, which may be held in a housing having a shape and size similar to those of crates 19 (or of a multiple of the dimensions of a crate 19) may be placed on top of the stack of crates 19 or may be stacked in-between them. Fogger 22 may also produce a cloud 28 of pesticide into air space 26 above the cargo. It will be appreciated that although only a subsection of crates 19 are shown, a typical reefer 10 may consist of approximately 1200 crates 19 stacked on a pallet (five crates 19 in each layer and approximately twelve layers). It will also be appreciated that only one fogger 22 may be required per reefer 10.

As mentioned hereinabove, cloud 28 may have droplets 30 which may range in size between 1,000-0.001 μm and may typically be on the order of 5 μm or less in size. Droplets 30, being so small, may be relatively stable and may hang in the air for a significant amount of time. As a result, they may disperse relatively evenly within reefer 10 due to the circulation operation of refrigeration unit 12. As a result, and as can be seen in FIG. 2, droplets 30 may land on and may cover produce 20, within crates 19. Moreover, since the droplets contain pesticide and since they hang in the air, the result may be antiseptic air generally throughout the container.

Figure 3:
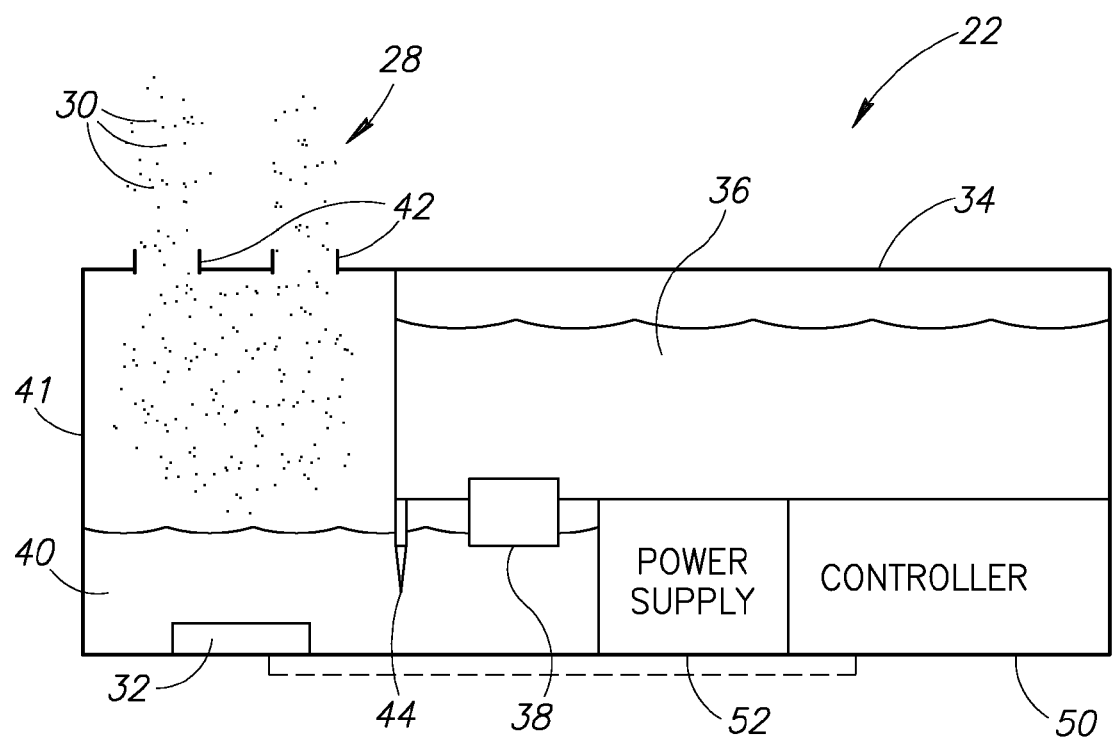
FIG. 3 is a detailed illustration of the ultrasonic fogger of FIG. 1.

As shown in FIG. 3 to which reference is now made, Applicants have realized that fogger 22 may utilize at least one ultrasonic nebulizer 32 to create cloud 28. An exemplary nebulizer is the NB Series of Ultrasonic Nebulizer Units from TDK.

As Applicants have realized, ultrasonic nebulizer(s) 32 may be small, lightweight and may produce tiny droplets 30 simply by vibrating in the presence of a bath or reservoir of pesticide Ultrasonic nebulizer(s) 32 may be digitally controlled but may provide mechanical motion without the need for any other mechanical elements. Thus, ultrasonic nebulizers 32 may be easily controlled and operated by a battery or any other power source and may, at the same time, not utilize a lot of its power.

Fogger 22 may comprise one or more ultrasonic nebulizer 32, a tank 34 holding a known amount of liquid pesticide 36, a float switch 38 and an operating reservoir 40 from which cloud 28 may rise as a mist. Float switch 38 may be any suitable float switch which may enable liquid to flow from tank 34 to operating reservoir 40 as the level of liquid in operating reservoir 40 falls below an operating level. Reservoir 40 may be stored in a housing 41 which may have at least one opening 42 therein through which droplets 30 may float out into the space of container 10.

Figure 4:
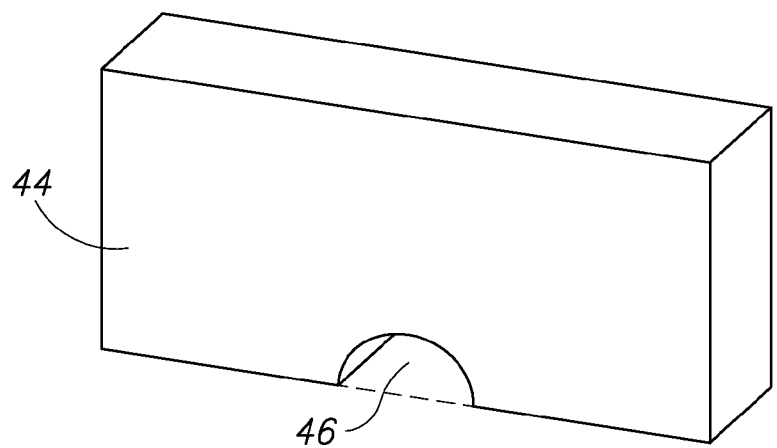
FIG. 4 is a schematic illustration of a barrier (wave breaker) useful in the fogger of FIG. 1.

In accordance with a preferred embodiment of the present invention, a liquid barrier (wave breaker) 44 may be placed in operation reservoir 40 to reduce the amount of waves induced in reservoir 40 due to the motion of container (either from the rocking motion of the ship or from the rolling of a truck). Reference is now briefly made to FIG. 4, which shows an exemplary breaker 44 formed as a wall with a tunnel 46 therein.

Returning to FIG. 3, fogger 22 may also comprise a controller 50 and a power supply 52. Controller 50 may be set to turn nebulizer(s) 32 on according to any predetermined appropriate schedule, which may include the interval between applications, such as every 12-200 hours or even once per shipment, and/or the length of the application, which may be any suitable length, such as ½ hour, an hour, an hour and a half, up to 24 hours, etc. The schedule may be a function of the shipping/transportation time, which may be up to 8 weeks, as well as the type of produce being shipped/transported. Controller 50 may include a mechanical timer, an electronic timer or a computer controlled timer.

Power supply 52 may be any suitable battery which may have sufficient power and current to power nebulizer(s) 32 for the expected total length of the applications. Since, as Applicants have realized, nebulizer(s) 32 do not utilize much power or current, a battery may typically suffice. Power supply 52 may, alternatively, be connectable to the AC mains supply of reefer 10, or any other source of electricity, as required Tank 34 may store a required volume of pesticide. In one illustrative example, tank 34 may hold between 5-30 liters. It will be appreciated that other amounts are also included and may be a function of the size of reefer 10, the amount of fog to be created at each interval, and the length of time the shipping is expected to last. For example, the present invention may generate a fog of between 100-5000 cc/hour.

An exemplary pesticide may be formulations of stabilized hydrogen peroxide (STHP), described in any of PCT Patent Application PCT/US2011/051663, entitled "COMPOSITIONS AND METHODS OF TREATING EDIBLE MATTER AND SUBSTRATES THEREFOR" and filed Sep. 14, 2011, and U.S. Patent application also entitled "COMPOSITIONS AND METHODS OF TREATING EDIBLE MATTER AND SUBSTRATES THEREFOR" filed 14 Mar. 2013, U.S. Ser. No. 13/830,982 CIP assigned to the common assignee of the present invention and incorporated herein by reference. However, other pesticides (fungicides and bactericides) such as TBZ and Imazalil are also incorporated in the present invention. Moreover, as Applicants have realized, since fogger 22 may be relatively small and since it may function without a connection to the mains lines of reefer 10, fogger 22 may be easy to install and to add to any suitable reefer 10 and/or any transportation means.

It will further be appreciated that, since the air in reefer 10 may include droplets 30 which are of an antiseptic liquid, this may affect produce 20 which may result in loss of quality and/or loss of quantity of produce 20 during the transportation process.

It will also be appreciated that reefer 10 is just one example of the type of container in which the present invention may be placed. Fogger 10 may be operative within other types of transportation containers which may hold produce for a significant amount of time, such as truck containers, train wagons, ventilated containers and a dry van containers It will further be appreciated that the present invention enables the volume of fresh air that currently needs to be exchanged in order to keep the produce fresh to be reduced. In the prior art, the air needs to be exchanged in order to improve the produce. But with fogger 22, the produce may be better preserved and therefore, there may be less need to exchange air. As a result, less energy needs to be expended both to exchange the air and to cool it down. With fogger 22, an exchange of air of 10-20% is preferable.

Moreover, prior art reefers remove humidity from the air in the container in order to maintain the quality of the produce. While the produce does not go bad, the produce loses weight due to the reduced humidity. By adding cloud 28 into the space of the container, fogger 22 adds humidity to the air in reefer 10. The relative humidity may be between 30%-100% and the produce generally maintains its weight as a result.

It will also be appreciated that fogger 22 may control pathogens such as but not limited to *Penicillium, Alternaria,* Rizopuse, Grey mold, *Salmonella, E. coli, Stafhilococcus, Pseudomonas, Enterococcus, Candida, Aspergillius,* etc which may attack fruits and vegetables, raw meat and meat produce, milk and milk produce, eggs, fish, flowers and flower bulbs, etc.

It will be appreciated that the present invention may be utilized for short haul trucks as well that may not have a refrigeration unit or that may not provide air circulation. For example, closed trucks with no cooling or internal air circulation, such as those that operate in remote or undeveloped areas, may utilize the present invention. It will be appreciated that the present invention may be placed into any type of transportation container, such as a reefer container, a ventilated container or a dry van container.

Figure 5:
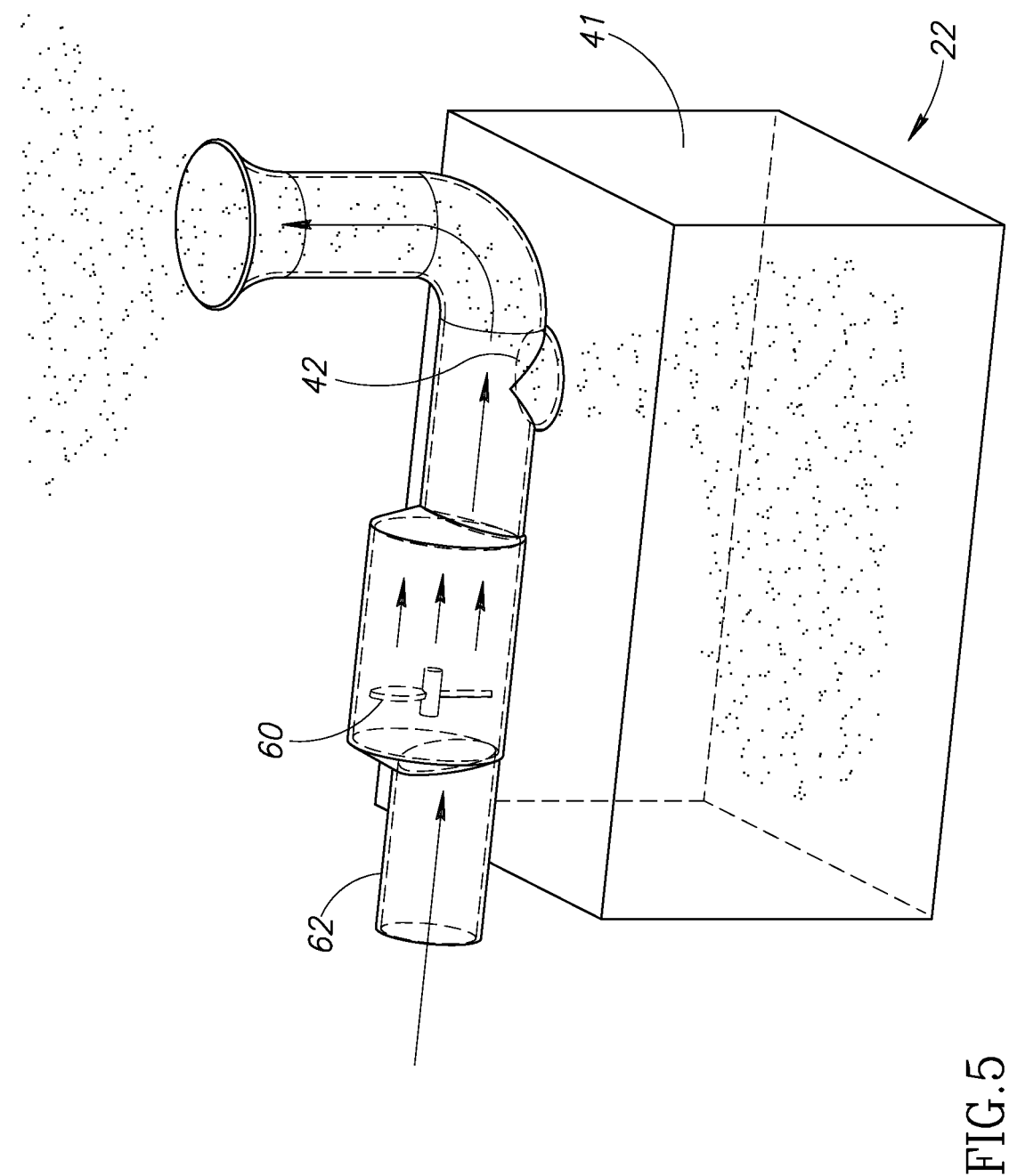
FIG. 5 is a schematic illustration of an alternative embodiment of the ultrasonic fogger of FIG. 2.

In accordance with an alternative embodiment of the present invention and as shown in FIG. 5 to which reference is now made, fogger 22 may also comprise a blower 60 to move cloud 28 around in the transportation container and in particular, in a transportation container with no air circulation of its own.

In this alternative embodiment, fogger 22 may additionally comprise a blower pipe 62, shaped to match the shape of housing 41 of fogger 22 and having an outlet directed upwards. Blower pipe 62 may bring air to blower 60 and from blower 60 over opening 42 and from opening 42 upwards, to the open space of the transportation container. Blower pipe 62 may have an opening therein connected to opening 42 of housing 41 thereby to move cloud 28 from fogger 22 to the air space of the transportation container.

It will be appreciated that blower 60 may blow air over opening 42, which, via venturi suction, may suck cloud 28 up into blower pipe 62, which, in turn, may elevate cloud 28 to the outlet at the high end of blower pipe 62. Thus, blower 60 and blower pipe 62 may provide circulation of internal air within the closed transportation container, starting from below fogger 22, collecting cloud 28 of micro droplets and releasing cloud 28 upwards toward the head space of the closed transportation container. This movement will generally ensure an even spread of cloud 28 over the shipped produce.

Figure 6:
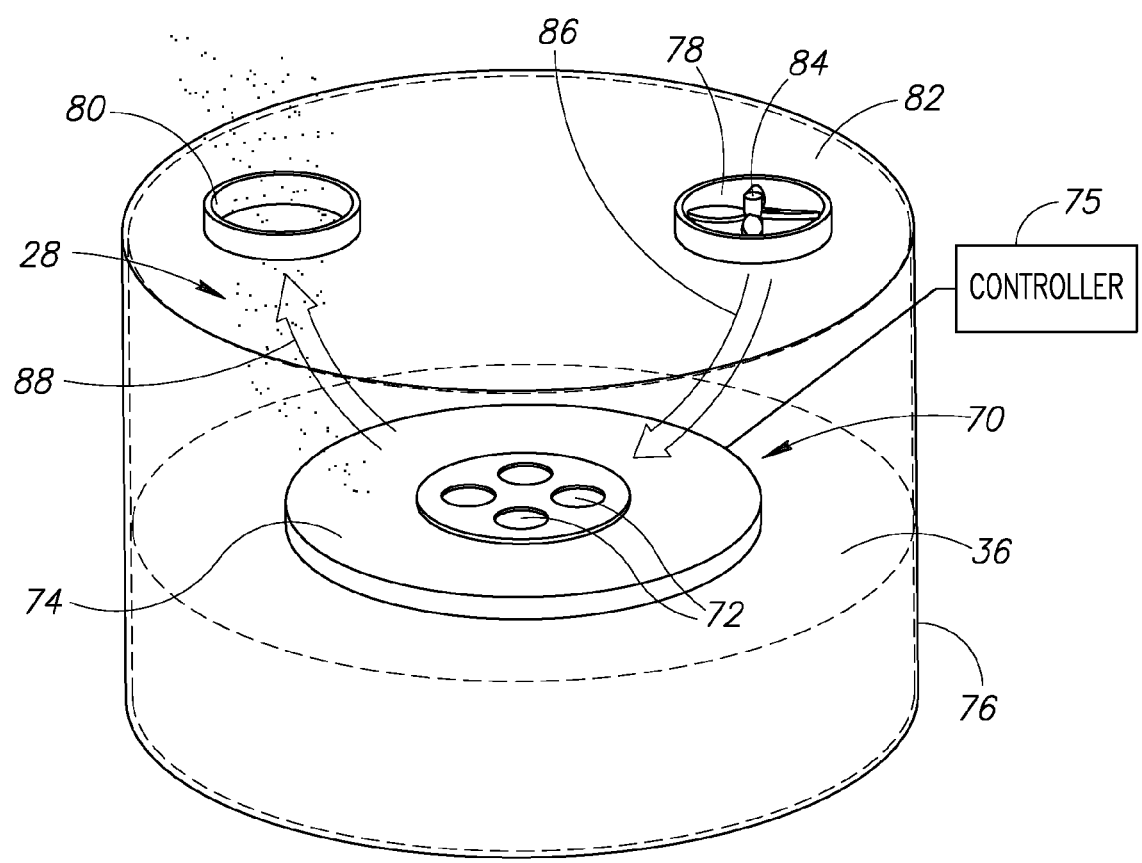
FIG. 6 is a schematic illustration of an alternative embodiment of the fogger of the present invention.

Reference is now made to FIG. 6, which illustrates an alternative embodiment of the fogger of the present invention using a floating nebulizer 70, such as those manufactured by Foshan Nanhai Techsin Electronic Co., Ltd. This embodiment may comprise floating nebulizer 70, a tank 76 and a blower 84.

Floating nebulizer 70 may comprise a plurality of nebulizers 72 mounted in a flotation device 74, such as a plastic coated, ring of foam. Thus, nebulizers 72 may float on the top of a liquid. In accordance with the present invention, the liquid may be liquid pesticide 36 as described hereinabove.

In accordance with a preferred embodiment of the present invention, tank 76 may be of a suitable size and shape for a transportation container and floating nebulizer 70 may float on the surface of liquid 36 held therein. Tank 76 may also have at least two openings 78 and 80 in a cover 82 thereof and blower 84 may be held over opening 78 which may be an inlet for air.

In operation, blower 84 may blow air through opening 78, as indicated by arrow 86, which air may move cloud 28 of micro droplets from above floating nebulizer 70 and out opening 80, as indicated by arrow 88.

Floating nebulizer 70 may include batteries (not shown) to power its operation, which batteries may provide enough power to power nebulizers 72 for the desired length of time. Floating nebulizer 70 may also comprise a controller 75 similar to controller 50 to control the schedule of operation as described hereinabove.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An apparatus for maintaining produce stored in a transportation container, the apparatus comprising:
    a housing having at least one opening therein; and
    a reservoir holding an active amount of liquid pesticide;
    a breaker to reduce the amount of waves in said reservoir; and
    at least one ultrasonic nebulizer suitable for generating fog from said liquid pesticide, said fog rising through said opening to generate a cloud of micro droplets of said liquid pesticide in said container.

2. The apparatus of claim 1 and also comprising:
    a tank of said liquid pesticide; and
    a float switch to maintain said reservoir with a predetermined amount of liquid.

3. The apparatus of claim 1 and also comprising a battery power source or any other power source.

4. The apparatus of claim 1 and wherein said liquid pesticide is a formulation of stabilized hydrogen peroxide.

5. The apparatus of claim 1 and wherein said liquid pesticide is at least one of Thiabendazole ($C_{10}H_7N_3S$) and Enilconazole ($C_{14}H_{14}Cl_2N_2O$).

6. The apparatus of claim 1 and wherein said fog comprises droplets of less than 10 μm in size.

7. The apparatus of claim 1 and also comprising a controller to operate said at least one ultrasonic nebulizer.

8. The apparatus of claim 1 and wherein said controller comprises a timer to control the interval and length of the operation of said at least one ultrasonic nebulizer.

9. The apparatus of claim 1 and wherein said transportation container is any of the following containers: a marine container, a truck container, and a train wagon.

10. The apparatus of claim 1 and wherein said transportation container is any of the following containers: a refrigerated container, a ventilated container and a dry van container.

11. The apparatus of claim 1 wherein said at least one ultrasonic nebulizer is formed on a floatation device.

12. The apparatus of claim 1 and also comprising:
a blower to move said cloud away from said opening; and
a blower pipe to direct said cloud within said container.

13. A method for maintaining produce stored in a transportation container, the method comprising:
generating using an apparatus for maintaining produce stored in a transportation container, the apparatus comprising a reservoir holding an active amount of said liquid pesticide and a breaker to reduce the amount of waves in said reservoir, a fog of antiseptic air throughout said transportation container from a liquid pesticide, said fog having micro droplets of pesticide, wherein said droplets are of less than 10 microns in size.

14. The method of claim 13 and wherein said liquid pesticide is a formulation of stabilized hydrogen peroxide.

15. The method of claim 13 and wherein said liquid pesticide is at least one of Thiabendazole ($C_{10}H_7N_3S$) and Enilconazole ($C_{14}H_{14}Cl_2N_2O$).

16. The method of claim 13 and wherein said generating comprises activating an ultrasonic nebulizer in said apparatus suitable to generate said fog at predetermined intervals of predetermined length.

17. The method of claim 13 and wherein said transportation container is one of the following containers: a marine container, a truck container, a train wagon, a reefer container, a ventilated container and a dry van container.

18. The method of claim 13 further comprising evenly distributing said fog throughout said transportation container using a blower in said apparatus.

* * * * *